June 23, 1936.  A. B. CHAMBERS  2,045,123
METHOD OF MANUFACTURING RUBBER HOSE FOR AIR LINES
Filed June 25, 1935
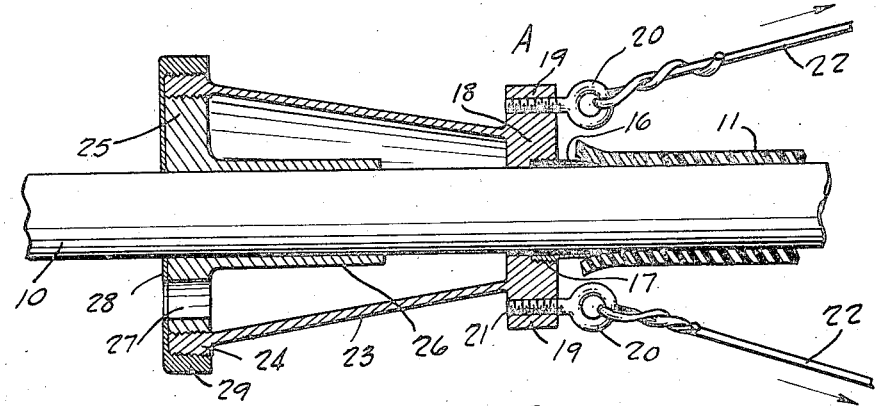
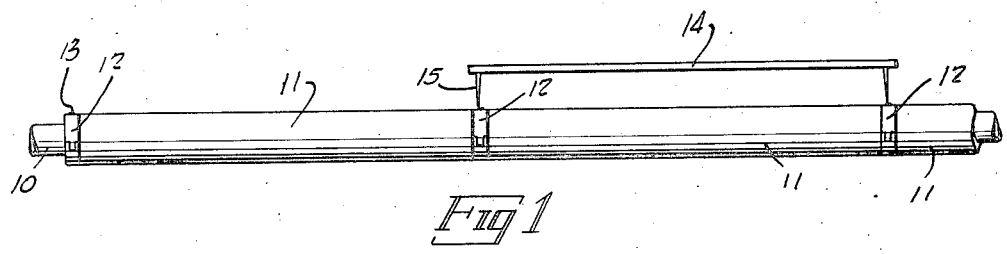
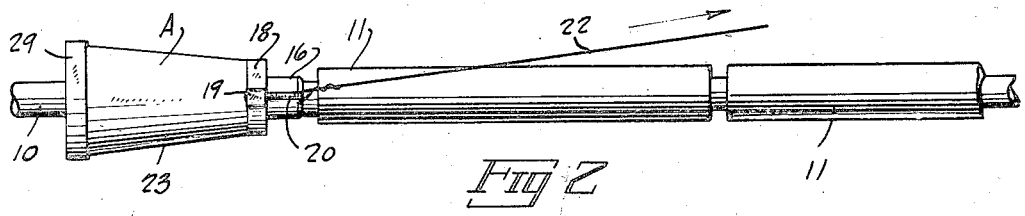
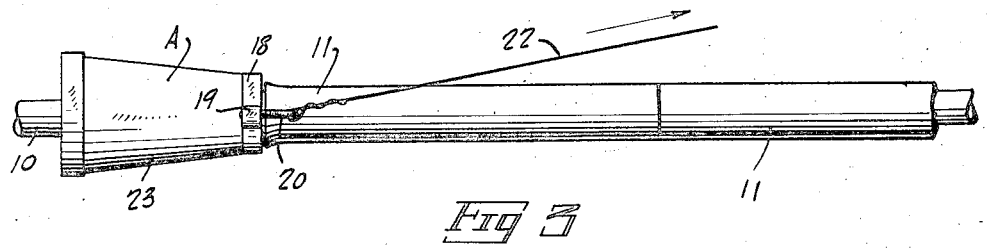
INVENTOR:
ALBERT B CHAMBERS
BY
Joshua R H Hotts
ATTORNEY Patented June 23, 1936

2,045,123

UNITED STATES PATENT OFFICE 2,045,123

METHOD OF MANUFACTURING RUBBER HOSE FOR AIR LINES

Albert B. Chambers, Philadelphia, Pa.

Application June 25, 1935, Serial No. 28,339

4 Claims. (Cl. 18—53)

This invention relates to the method of manufacturing rubber hose such as commonly employed in airlines and the like. The invention is primarily concerned with improvements in certain steps of the manufacturing methods as they are now being carried out.

Present day methods of manufacturing air-line hose are intimately associated with a certain condition inherent to their actual commercial use. This condition is the exactness required in the dimension of a finished article. Air-line hose is commonly employed at the couplings between railroad cars and the railroad companies have very positive requirements as to the dimensions they will accept, the margin of error allowed to the manufacturer being very small.

Manufacturing methods now commonly availed of are now characterized by the inclusion, among other steps, of the placing of a plurality of the lengths of hose on a pole or mandrel in spaced relation, which step is followed by a wrapping of the hose sections with a fabric which functions as a mold during vulcanizing operation. This wrapping is carried out while the fabric is under an appreciable tension, and due to the nature of the material being treated, the latter is very often deformed to vary the lengths of the sections on the pole.

As a result of this condition, when the work comes from the vulcanizing ovens, and the wrapping removed, some sections are found to be too long, and others too short, and with present day methods, the percentage of sections which must be discarded or recut is comparatively great, with accompanying loss to the manufacturers.

With this condition in mind, this invention has in view, as an important object, the provision of a method of manufacturing air-line hose, which includes the steps of placing sections of the hose on a pole and positively spacing the sections apart thereon.

With this arrangement, any distortion on the part of the hose sections takes place between certain predetermined confines to obviate the variations in the length of the finished product.

A more detailed object of the invention is to include in a method for manufacturing air-line hose, the steps of accurately spacing apart spacing elements on the pole, the distance between the spacing elements being gauged not by the length of the sections themselves, which are placed on the pole, but by a gauge independent of the hose section.

Another important object of the present invention is to provide in the manufacture of air-line hose, a novel method of stripping the sections from the pole subsequent to their vulcanization. At the present time these stripping operations are carried out only with considerable difficulty and inconvenience, as they are dependent, to a large extent, upon manual power. It is common practice to avail of compressed air as a medium for breaking the sections loose from the pole, and the use of this compressed air does have some tendency to move the sections along the pole.

However, it is necessary to supplement the air pressure with considerable manual exertion. Accordingly, this invention has in view the provision of a method involving the stripping of the air hose sections from the pole under power separate from that provided by the compressed air.

Another end in view is the provision of a method involving novel steps of placing the sections on the pole. So far the art does not contemplate placing the air hose sections on the poles under power, but in accordance with this invention, the manufacture is facilitated by such a step.

A more detailed refinement of the invention lies in the use of the same apparatus for placing the sections on the pole as it is used to effect their removal.

Other more detailed objects and advantages of the invention are associated with the provision of the stripping apparatus for carrying out the stripping functions and other steps involved in the carrying out of the above noted objectives in a practical embodiment.

The invention, therefore, comprises a method of manufacturing air-line hose which includes, in addition to certain conventional steps, those of placing the hose sections on a pole under power, accurately spacing them apart thereon, confining any distortion which may take place between certain positive limits, and stripping the hose sections from the pole by the use of compressed air and supplemental power means.

For a full and more complete understanding of the invention, reference may be had to the following description and accompanying drawing, wherein:

Figure 1 is a view in side elevation of a portion of a pole with air hose sections spaced apart thereon in accordance with the precepts of this invention, Figure 2 develops the condition of the hose sections on the pole just prior to functioning of the stripping apparatus, Figure 3 is a view somewhat similar to Figure 2, bringing out the condition of the hose sections as the stripping apparatus functions, and Figure 4 is a fragmentary showing in section of the stripping apparatus provided by this invention, the pole being shown in elevation.

In describing this invention I propose to point out the usual steps of manufacturing sections of air-line hose and the relation of my novel steps therewith. An inner sleeve of rubber is first formed on a suitable mandrel which is usually about 50 feet in length. About this inner sleeve several plies of duck are wound, it being common practice to include four plies of duck in the wrapping. An outer sleeve of rubber is then formed about the duck wrapping.

The entire 50 foot length of hose in this formative stage is now stripped from the mandrel and cut into sections which are something short of the 22" usually required by railroad specifications. The cut ends are then treated with cement which is allowed to dry, whereupon rubber caps are added at these extremities. Heretofore it has been the practice to cut these caps from tubular stock, but this invention contemplates having the caps stamped from sheet material, this method being preferred due to the assurance of uniformity in the thickness of the caps.

After the caps have been applied to each end of each hose section, the latter is placed on the pole, which is also usually about 50 feet in length, and this invention involves the use of power means for facilitating the positioning of the section on the pole. In the drawing, this pole is referred to by the reference character 10, and one of the sections by the reference character 11. Prior to the slipping on of the first section 11, a spacing ring 12 is securely fixed in position on the pole 10. This spacing ring 12 is preferably of a structure accurately illustrated and described in my copending application, Serial No. 28,340, filed June 25th, 1935.

However, for the purpose of this description of the specification, it may be briefly described as being of a split-ring construction including a set screw at 13, which constitutes a means of fastening it against movement on the pole 10, and also has a seat for a gauge. The section 11 is now slipped on the pole, preferably under power, as by the use of apparatus similar to that shown in Figure 4, and referred to generally by the reference character A. This apparatus is intended primarily for stripping purposes, and will be hereinafter described in detail.

After the first section 11 is slipped on the pole 10, a second spacing ring 12 is secured in position on the pole 10, its position being determined not by the length of the section 11, but by a gauge which is indicated at 14. This gauge has depending arms 15 which are received in the hollow seats of the set screws 13. The gauge 14 extends between two adjacent spacing rings 12 and is used as each ring is put on successively after the section has been slipped over the pole.

The assembly of hose sections and spacing rings is now ready to be wrapped. Suitable fabric is availed of for this purpose, and it is tightly wound about the sections, with the operator maintaining considerable tension on the fabric as the pole is being rotated. Any distortion which this wrapping will cause in the hose section will take place between the limits defined by the spacing rings 12.

The pole with the sections thereon and the wrapping is now inserted in a vulcanizing oven and subjected to vulcanization. During this action the wrapping serves as a mold to properly shape the ultimate product. Upon removal from the vulcanizing oven, the fabric wrapping is removed, after which each of the split rings is taken off from the pole, leaving the latter with only the air hose sections thereon. These sections are stripped from the pole by the apparatus shown in Figure 4 and designated A.

This apparatus A comprises a sleeve 16 having an edge adapted to be inserted between the edge of a hose section and the pole, as clearly developed in Figure 4. The sleeve 16 is threaded at 17 and a threaded portion 17 is screwed into a collar 18 which is disposed about the pole 10. This collar 18 is provided with a pair of diametrically opposite lugs 19, each of which carries a hook member 20 that is threaded therein, as shown at 21. Cables 22 are fastened to the hooks 20 and extend to a drum (not shown), about which they are wound under power.

Extending rearwardly from the collar 18 is an air jack of conical formation, which is designated 23. This jacket 23 terminates in a cylindrical portion 24 which is both interiorly and exteriorly threaded, the interior threads being screwed about a head 25 which is formed on a sleeve 26, and the sleeve 26 being slidably mounted on the pole 10. It is noted that the sleeve 25 is formed with an opening at 27 which constitutes a means for admitting air thereto under pressure. Finally, a cap member 28 having a cylindrical flange 29 is threaded on the exterior threads of the part 24 of the air jacket.

When the hose sections are ready to be stripped, they are in the position brought out in Figure 2. At this point compressed air is admitted to the air jacket through the openings 27, and this serves to break the sections loose from the pole. At the same time, tension is put on the cables 22 which causes the collar 18 to be moved axially along the pole 10. This movement serves to gather the sections 11 with their ends in abutting engagement, as shown in Figure 3, and after all of the hose sections are gathered in this manner, continued movement of the collar 18 causes them to be stripped from the pole.

While a preferred specific embodiment of the invention is hereinbefore set forth, it is to be understood that I am not to be limited to the exact steps and processes illustrated and described, because various changes and modifications may be made in putting the invention into practice, within the purview of the appended claims.

I claim:—

1. In the manufacture of sections of rubber hose for air-lines, which includes the step of wrapping a fabric under tension about hose sections of material to be vulcanized after they are assembled on a pole, the step of fastening a spacing ring on the pole between substantially adjacent the ends of adjoining hose sections.

2. A method of manufacturing rubber hose sections for air-lines which consists in first assembling a plurality of raw rubber sections on a pole in spaced relation with each of the sections confined within positive limits, said limits being in close proximity to the adjacent ends of adjoining sections, wrapping a fabric about the sections, subjecting the assembly to vulcanizing operations, removing the fabric, removing the spacing element, and then stripping the sections from the pole by breaking them loose therefrom by the use of compressed air and at the same time moving them axially of the pole.

3. The method of manufacturing rubber hose sections for air-lines which consists in first positioning and securing in position a spacing element on a pole, then slipping a hose section of material to be vulcanized over the pole under power into abutting engagement with the spacing element, then positioning and securing another spacing element in position in close proximity to the end of said hose section, and repeating these operations until a desired number of sections are assembled on the pole in spaced relation, wrapping a fabric about the assembled sections at the same time maintaining the fabric under tension, subjecting the assembled hose sections to a vulcanizing process, removing the fabric, then removing the spacing element, and finally stripping the sections from the pole by breaking the sections loose from the pole with the use of compressed air and at the same time causing axial movement thereof under power.

4. In the method of manufacturing rubber hose for air-lines, the steps of first accurately positioning a spacing ring on a pole and securely fastening it in this position, then slipping a hose section of raw material to be vulcanized on the pole under power, with one end of the said hose section substantially in engagement with the said spacing ring, then positioning and fastening another ring in position on the pole, gauging the position of the second ring from the first ring already in position whereby the second spacing ring is in close proximity to the other end of the said hose section, and wrapping a fabric under tension about said hose section.

ALBERT B. CHAMBERS.